United States Patent [19]

Benko

[11] 4,111,404

[45] Sep. 5, 1978

[54] FLAME CUTTING MACHINE FOR MODIFICATION OF RAILWAY CAR SIDE SILLS

[75] Inventor: John M. Benko, Munster, Ind.

[73] Assignee: Pullman Incorporated, Chicago, Ill.

[21] Appl. No.: 786,753

[22] Filed: Apr. 11, 1977

[51] Int. Cl.² .............................................. B23K 7/10
[52] U.S. Cl. ........................................ 266/58; 266/69
[58] Field of Search ...................... 266/58, 62, 67, 69, 266/71, 73

[56] References Cited

U.S. PATENT DOCUMENTS

| 1,698,173 | 1/1929 | Royer | 266/69 |
| 1,867,047 | 7/1932 | Anderson | 266/67 |
| 4,003,556 | 1/1977 | Roeder | 266/58 X |

Primary Examiner—Roy Lake
Assistant Examiner—Paul A. Bell
Attorney, Agent, or Firm—John A. Doninger

[57] ABSTRACT

A flame cutting machine for trimming side sill gussets comprises a trolley beam assembly mounted to roll longitudinally along the side sills of the car. A traveling beam is adjustable laterally on said trolley beam and includes side hanger frames on opposite ends thereof each of which supports a cutting torch arrangement including motor means for moving the cutting torch in a pre-determined pattern to trim portions of the side sill of a railway car.

9 Claims, 4 Drawing Figures

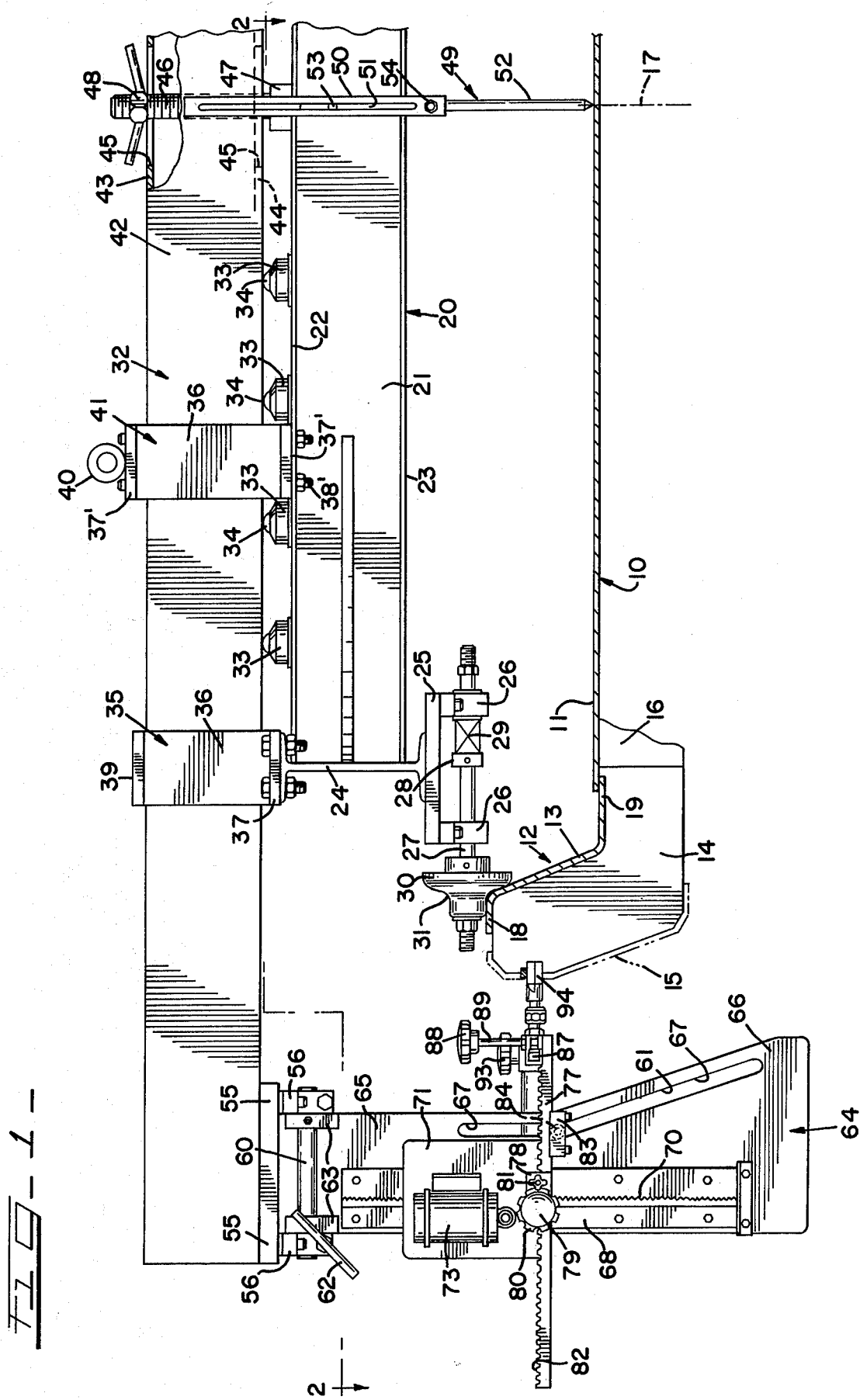

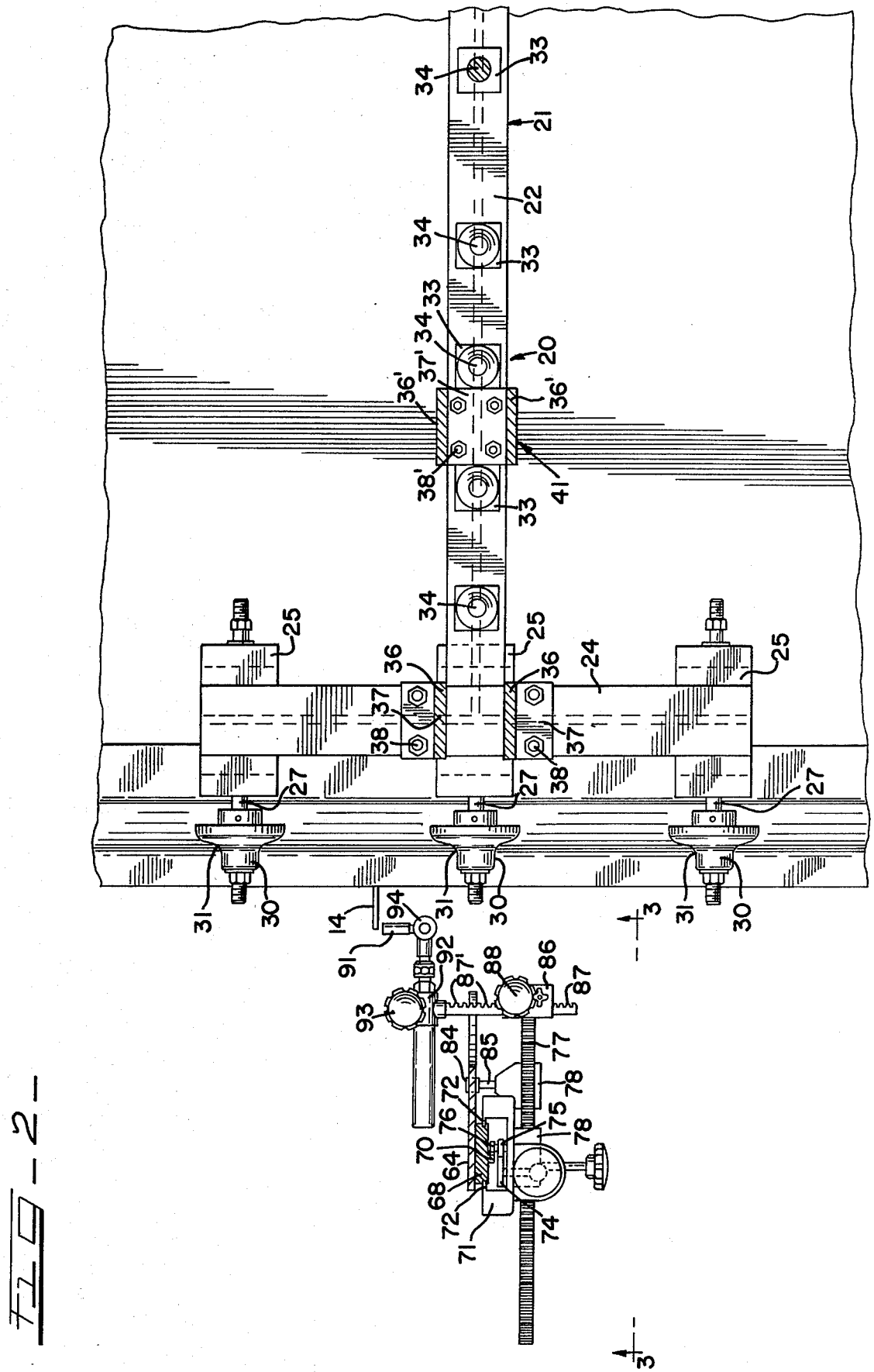

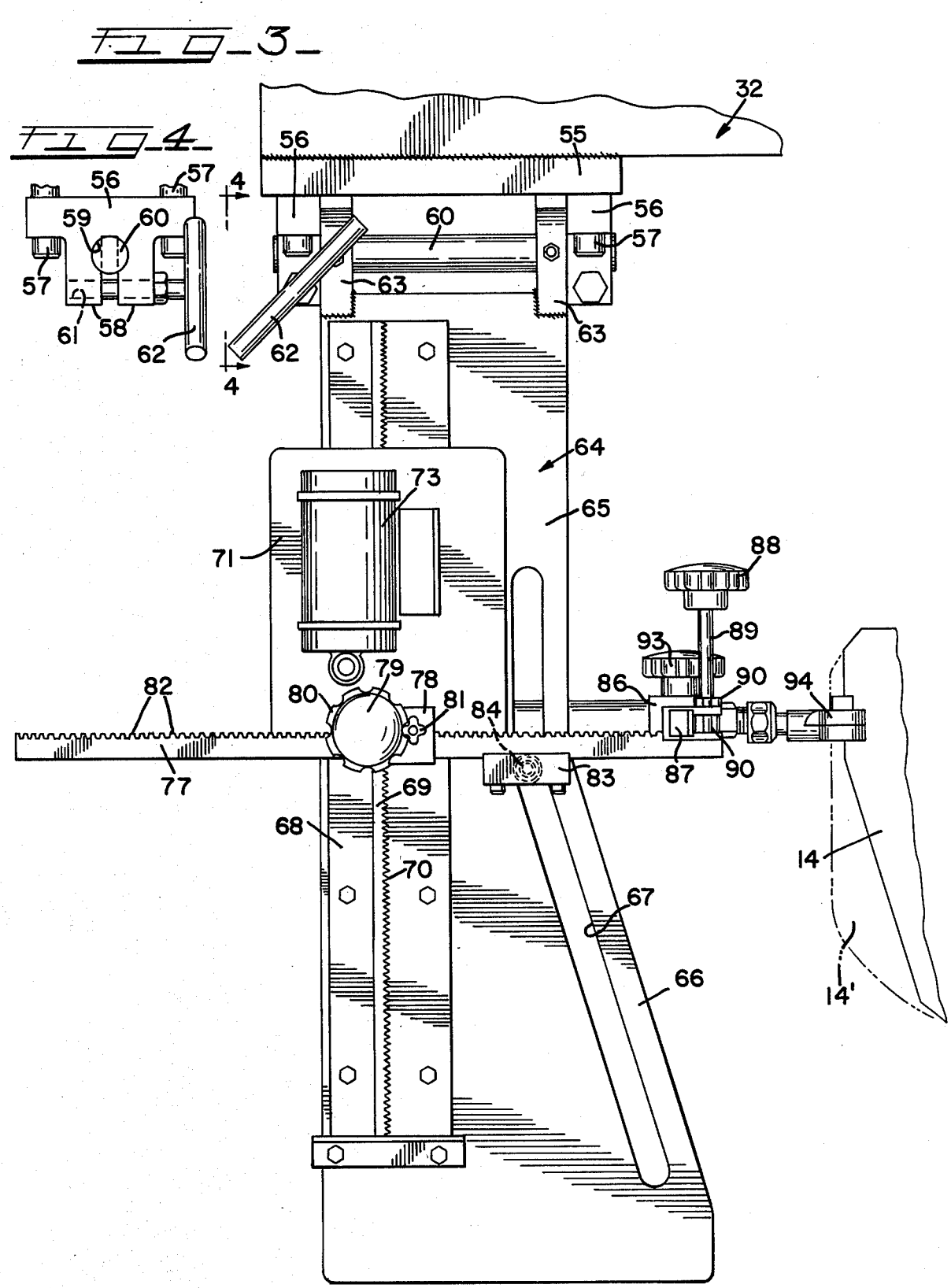

FLAME CUTTING MACHINE FOR MODIFICATION OF RAILWAY CAR SIDE SILLS

BACKGROUND OF THE INVENTION

1. Field of the Invention

The field of invention relates to a flame cutting machine and specifically to a combination which is adapted to be supported upon a railway car for modification by means of flame cutting certain portions of the car.

2. Description of the Prior Art

Prior art relating to the present invention includes U.S. Pat. Nos. 2,283,346 May 19, 1942, 2,515,302 July 13, 1950, 2,568,074 Sept. 18, 1951, 3,713,637 Jan. 30, 1973, and 3,843,103 Oct. 22, 1974. The present invention is an improvement over the prior art patents.

SUMMARY OF THE INVENTION

The present invention relates to a flame cutting assembly and combination which is particularly adapted for trimming the side sills of a railway car. The arrangement comprises a trolley which is supported on a laterally extending beam provided with rollers at opposite ends thereof which are guided on the upstanding side sills of a railway flat car. A traveling beam is supported on the trolley support beam the said traveling beam being laterally movable on rollers or bearing assemblies to provide for lateral adjustment of the traveling beam relative to the longitudinally movable trolley. The traveling beam includes downwardly extending hanger supports or frames which in turn have connected thereto and supported thereon a cutting torch which is adapted to trim portions from the side sill gussets which comprise a part of the side sill assembly of the railway car. The hanger members include rack and pinion means whereby the cutting torch may be moved vertically and guided by means of a guide slot to remove or cut predetermined portions of the side sill gussets as selected. The hanger assembly also includes manually adjustable means for moving the cutting torch longitudinally and laterally relative to the portions of the side sill which are to be trimmed.

BRIEF DESCRIPTION OF THE DRAWINGS

FIG. 1 is a cross-sectional view through one side of a railway car end showing in elevation one side of a trolley and traveling beam structure for supporting a frame and cutting torch assembly on opposite sides of the railway car;

FIG. 2 is a cross-sectional view taken substantially along the line 2—2 of FIG. 1;

FIG. 3 is a side elevational view taken substantially along the line 3—3 of FIG. 2;

FIG. 4 is a detail elevational view taken substantially along the line 4—4 of FIG. 3.

DESCRIPTION OF THE PREFERRED EMBODIMENT

In FIG. 1 a railway car body 10 is disclosed in cross section, only one-half of the same being shown, the other half being identical. The body 10 is of a flat car type and includes a floor 11 having on opposite sides thereof longitudinally extending side sills 12. The side sills 12 are of conventional design and include an inner flange sill plate member 13 having upper and lower flat flanges 18 and 19. The flanges 19 are suitably connected to the opposite ends of the floor 11. Throughout the length of the sill side members 13 there are provided longitudinally spaced and laterally extending plate or gusset members 14 to which is connected a flanged longitudinally extending side plate sill member 15. The side plate sill member 15 is shown in phantom lines since this plate is removed prior to the gusset trimming operation which the present invention performs. The car body also includes a plurality of transversely extending supports 16 which are spaced longitudinally along the car beneath the floor 11. As best shown in FIG. 1 the longitudinal center line of the car is indicated at 17.

The present railway flat car body 10 is to be modified by the present invention in that the side sills 12 are to be changed by removing portions 14' of the gussets 14 as shown in FIG. 3. Prior to this operation the outer flanged side sill plate 15 is removed the same having been welded to the side sill structure. After removal of the plate 15 the present frame cutting machine and apparatus is postioned on top of the flat car as indicated. The flame cutting apparatus includes a trolley generally indicated at 20 and comprises a transversely extending support beam 21 of I-beam configuration. The transverse support beam 21 includes upper flanges 22 and lower flanges 23. A pair of longitudinally extending I-beam sections 24, as best shown in FIG. 2 are connected to opposite ends of the beam 21. The lower portion of the I-beam sections 24 have connected thereto hanger plates 25 which support at opposite ends thereof pillow blocks or bearings 26. The blocks 26 are adapted to support shafts 27 which include collars 28 in engagement with springs 29 for urging the shafts 27 in an outward direction relative to the pillow blocks 26. The shafts have connected thereto at their outer ends rollers or wheels 30 including roller surfaces 31 which are seated upon and guided on the upper flanges 18 of the side sill assemblies 12. As best shown in FIG. 2 the I-beam sections 24 each have three sets of rollers 30 supported thereon to provide for a stable trolley construction adapted to move longitudinally upon the side sills of the railway car.

A traveling beam generally designated at 32 is mounted on the transverse I-support beam 21. A plurality of ball transfer members are designated at 33 and these are rigidly supported on the flange 22 of the beam 21. The transverse supports 33 include ball rollers 34 and the assembly is conventional in the art providing for a roller bearing type of support for the traveling beam so that it may move laterally to an adjusted position as selected by the operator. The longitudinal I-beam sections 24 also support outer guide housings 35 comprising vertical side plates 36 having lower flanges 37 which are suitably connected to the upper ends of the sections 24 by means of nuts and bolt assemblies 38. Top plates 39 are suitably connected to the side plates 36. The trolley assembly 20 also includes inner guide housings designated at 41 which also consist of vertical side plates 36' connected by means of bottom and top plates 37'. The bottom plates 37' are suitably connected to the flanges 22 of the transverse I-beam 21 by means of bolt and nut assemblies 38' as best shown in FIGS. 1 and 2. The housings 41 also have connected at their upper ends thereof hoist hooks 40 which are utilized to remove the cutting torch arrangement from one car body to another.

The traveling beam 32 comprises specifically side plates 42 a top plate 43 and a bottom plate 44 connected in tubular or rectangular relation. As best shown in FIG. 1 substantially centrally from opposite ends of the traveling beam 32, there are provided elongated slots 45 vertically aligned in the top and bottom plates 43 and 44 respectively. A threaded rod 46 is rigidly supported on a block 47 in turn rigidly connected to the top flange 22 of the transverse I-beam 21. The rod 46 projects upwardly through the slots 45 and a wing nut 48 is adapted to rigidly connect the traveling beam to the transverse I-beam 21 after it has been properly centered along the longitudinal center line 17 of the car structure. To facilitate the centering of the traveling beam there is provided a center line indicator generally designated at 49 which includes a tube 50 rigidly connected to one of the sides of the traveling beam 32. The tube 50 includes an elongated vertical slot 51 and an indicator needle 52 is slidably disposed within the tube 50. The indicator needle 52 includes thereon a slide element 53 slidable within the slot 51 and a set screw 54 in the lower end of the tube 50 rigidly connects the indicator needle in proper height position as indicated in FIG. 1. The traveling beam 32 supports at opposite ends thereof hanger plates 55 for supporting the flame cutting arrangement. The traveling beam 32 is provided with hanger plates 55 at opposite ends thereof which have supported thereon bearings or pillow blocks 56 one of which is best shown in FIG. 4. The pillow blocks 56 are suitably connected by means of bolts 57 to the traveling beam 32. Each pillow block 56 includes a pair of jaws 58 which are provided with a split bore 59 within which a shaft 60 is positioned. The shaft 60 extends transversely through the pillow blocks 56 and support vertical hangers 63. The shaft 60 is adapted to be locked against rotation by means of a transversely extending threaded bore 61 provided in one of the jaws 58. The lock bolt 62 extends through the other jaw 58 and into the threaded bore of the other jaw 58 so that upon rotation of the lock bolt 62 the jaws 58 are moved together to thereby grasp and keep the shaft 60 from rotation.

The hangers 63 which are supported for rotation with the shaft 60 are rigidly connected to cutting torch hanger plates or frames 64 which includes an upper plate portion 65 and a lower plate portion 66. Each hanger plate 64 also includes a guide slot 67. A vertical track is also provided on each of the frames 64 and includes a vertical rack 69 having rack teeth 70.

As best shown in FIGS. 1 and 2 a torch carrier plate structure 71 is guided as indicated at 72 on the vertical track 68 to move vertically with respect thereto. The drive motor 73 is supported on the plate structure 71 and includes a drive gear 74 which also rotates a driven gear 75 in turn driving a sprocket 76 which is in engagement with the rack teeth 70 whereby the torch carrier plate structure 71 may be moved vertically relative to the frame 64.

The horizontal rack bar 77 is also supported on the frame 64. The supports 78 on the plate structure 71 supports the rack 77. The knob 79 rotatably carried by the support 78 includes a sprocket 80 which in turn is adapted to drive a gear 81 which in turn rotates a pinion or sprocket [not shown] which is in engagement with the teeth 82 of the rack bar 77 for moving the same horizontally toward and away from the side wall assembly 12 as best shown in FIGS. 1 and 3.

Horizontal movement of the rack bar 77 is also achieved by means of a cam follower 84 which is supported on a cam follower support 83 connected to the rack bar 77. The cam follower 84 is vertically movable and guided within the slot 67.

A support housing 86 is connected to the end of the rack bar 77. The support housing 86 supports a longitudinally extending rack bar 87. A hand knob 88 is connected to a vertical shaft 89 in turn rotatably supported on the housing 86. The shaft 89 is provided at its lower end with a drive gear 90 which is adapted to engage rack teeth 87' whereby the rack 87 may be longitudinally adjusted relative to the rack 77. A torch assembly 91 is adjustably supported on a support or clamp sleeve 92 in turn connected to one end of the rack bar 87. A locking knob 93 is connected to the clamping sleeve 92 and may be tightened or loosened so that the axial position of the torch 91 may be adjusted. The torch 91 includes a rotatable nozzle assembly 94 which also may be used to adjust the relative position of the torch 91 about a vertical axis.

THE OPERATION

The present invention is particularly adapted for modification of the car body 10. The gussets 14 which are connected to the inner flanged sill member 13 and to the outer flange sill member 15 are to be modified by removing a section of each of the gussets which is designated at 14' as indicated in the phantom lines of FIG. 3. Both of the side sills of the car body are thus to be modified by removing material 14' from the main portion of the gussets 14. Initially therefore the outer sill member 15 is removed on both sides of the center sill. The flame cutting apparatus and arrangement is hoisted into the positions shown in the drawings and the wing nut 48 is loosened after the trolley has been supported with its rollers 30 and surfaces 31 seated upon the side sill plates 13'. The center line of the car body 17 has been determined by scribing or other markings which extends the length of the body. The indicator 52 is now placed on the center line 17 as shown in FIG. 1 and the traveling beam 32 is locked in position by tightening the wing nuts 48 in the centrally located position indicated. Movement laterally to this adjusted and locked position is of course facilitated by the ball transfer arrangements 33 shown which permit the traveling beam to be easily moved and accurately positioned.

The rollers 30 are continually biased to the position in engagement with the sides of the inner sill members 13 by means of the springs 29 in their biasing engagement with the flanges or collars 28. Thus the trolley and the traveling beam are now positioned and the flame cutting frames 64 are now placed in the proper vertical position. This adjustment is possible by loosening up the lock bolts 62 thereby permitting the frame 65 to assume an exactly vertical position as desired and tightening the lock bolt 62 wherein the shaft 60 and frames are locked in the desired position. Longitudinal adjustment of the cutting torch 91 is achieved by turning the knob 88 thereby adjusting the rack 87 longitudinally to the desired location relative to each of the gussets 14. Manual adjustment of the rack 82 is possible by means of the knob 79 and sprocket 80 which drives the driven gear or pinion 81. However, during operation and vertical movement which is effectuated by the motor 73 the plate structure 71 and rack 82 are moved vertically relative to the vertical track 68 and during this vertical movement the cam follower 84 moves initially downwardly in the guide slots 67 and then outwardly angularly as the follower 84 travels down in the slot. During this movement the knob 79 is free to rotate by virtue of the lateral movement of the rack bar 82 in response to the guided follower action of the follower 84 in slot 67.

Thus the motor 73 on both sides of the assembly are placed in operation for vertical movement of the track carrier plate structure 71 which by virtue of the positioning of the slot 67 provides for movement of the nozzle or torch 91 to flame cut the gusset 14 in the manner indicated in FIG. 3. The nozzle 91 also may be adjusted with respect to a longitudinal axis by operation of knob 93 which secures a nozzle on the clamp sleeve 92 mounted on the rack 87. By virtue of the present arrangement an accurate flame cutting of the gussets results as the trolley and traveling beam are moved longitudinally along the car from one end to the other. Thus the modification of the railway car bodies is easily achieved and efficiently accomplished.

What is claimed is:

1. A flame cutting machine for trimming a plurality of longitudinally spaced laterally extending plate members in end-to-end alignment projecting outwardly from the sides of a railway car body comprising;
   a support beam extending transversely of said car body;
   guide means supported on said body and connected to said support beam for providing longitudinal movement of said beam relative to said body;
   a second beam supported on said first beam for lateral movement with respect thereto;
   means releasably locking said second beam to said first beam;
   means for cutting said plate members;
   means for supporting said cutting means on said second beam;
   and means associated with the second beam for maintaining said second beam and cutting means centered with respect to said car body.

2. The invention according to claim 1, and
   said means for maintaining said second beam in centered relation comprising:
   a centering indicator connected to said second beam and operatively associated with said releasable locking means for adjusting the lateral position of said second beam and said cutting means relative to the longitudinal center line of the car body.

3. The invention according to claim 2,
   said guide means including transversely spaced rollers connected to said first beam and riding on the side sills to facilitate longitudinal movement of the machine, and
   said rollers including biasing means for urging the rollers against said sidesills and allowing for limited lateral movement of the first and second beams thereby allowing retention of said centering indicator on the centerline of the car body without releasing said releasable locking means.

4. The invention according to claim 1, and said supporting means being hingedly mounted from said second beam.

5. A flame cutting machine for trimming laterally extending plate members projecting outwardly from the sides of a railway car body having longitudinally extending side sills which support said plate members comprising:
   a support beam extending transversely of said car body;
   guide means supported on said body and connected to said support beam for providing longitudinal movement of said beam relative to said body;
   a second beam supported on said first beam for lateral movement with respect thereto;
   means releasably locking said second beam to said first beam;
   a cutting torch frame supported on each of the opposite ends of said second beam and projecting downwardly on opposite sides of said car body;
   a cutting torch on each frame;
   means guiding said cutting torch on said frame for flame cutting portions from said plate members;
   and said frame being hingedly mounted on said second beam about a hinge axis parallel to the longitudinal axis of said second beam.

6. The invention in accordance with claim 5, said guide means including a longitudinally extending bracket connected to each of the opposite ends of said first beam, and
   longitudinally spaced rollers on said brackets supported and guided by said side sills.

7. The invention in accordance with claim 6,
   said first beam and second beam including cooperating anti-friction means for facilitating relative lateral movement of one beam relative to the other.

8. The invention in accordance with claim 5,
   including releasable locking means for locking said frames in a plurality of hinged positions relative to said second beam.

9. The invention in accordance with claim 5,
   including a centering indicator on said second beam for indicating the lateral position thereof relative to the longitudinal centerline of said car body.

* * * * *